United States Patent [19]

Tokitsu

[11] 4,390,905
[45] Jun. 28, 1983

[54] MAGNETIC CARD RECORDING APPARATUS

[75] Inventor: Naoki Tokitsu, Chiryu, Japan

[73] Assignee: Nippondenso Co., Ltd., Kariya, Japan

[21] Appl. No.: 276,251

[22] Filed: Jun. 22, 1981

[30] Foreign Application Priority Data

Jul. 24, 1980 [JP] Japan .................. 55-101671

[51] Int. Cl.³ .................. G11B 5/09; G11B 25/04
[52] U.S. Cl. .................. 360/2; 235/436; 235/466; 235/482; 360/51
[58] Field of Search .................. 360/2, 51; 235/436, 235/466, 482

[56] References Cited

U.S. PATENT DOCUMENTS 2,853,357  9/1958  Barber .
3,217,329  11/1965  Gabor .
3,914,789  10/1975  Coker, Jr. et al. .................. 360/2
4,264,934  4/1981  Mattes .................. 360/2

Primary Examiner—Vincent P. Canney
Attorney, Agent, or Firm—Cushman, Darby & Cushman

[57] ABSTRACT

A magnetic card recording apparatus records information with a desired predetermined high recording density on a magnetic card moving at a varying speed. The apparatus comprises guide means for guiding a moving magnetic card, a magnetic head disposed to contact with the magnetic card moving through the guide means, an electric signal generator having a movable member moved in response to the movement of the magnetic card, a voltage signal generator for receiving the output signal of the electric signal generator to generate a voltage signal of a magnitude proportional to the moving speed of the magnetic card, an oscillator oscillating at a frequency proportional to the magnitude of the output voltage signal of the voltage signal generator, a converter for converting an input information signal on the basis of an output signal of the oscillator, and a writing controller for controlling the recording of an output signal of the converter on the magnetic card.

9 Claims, 4 Drawing Figures

MAGNETIC CARD RECORDING APPARATUS

BACKGROUND OF THE INVENTION

1. Field of the Invention

The present invention relates to a magnetic card recording apparatus so designed that information is recorded with a predetermined high recording density on a magnetic card moving at a varying speed.

2. Description of the Prior Art

Magnetic cards made of a plastic material or a paper coated with a magnetic material have recently been used as bank cards, credit cards, gasoline station service cards or the like.

These magnetic cards have been mainly adapted for the purpose of reading, and it has been a usual practice to effect the writing of information on the cards collectively at an issuing center or the like. The reason is that, since the magnetic card must be moved at a constant speed in order to record information on the magnetic card with a constant recording density, many of the recording apparatuses are of the type in which the magnetic card is moved at a constant speed by an electric motor or the like and thus the apparatus become large in size and high in cost.

Another type of apparatus is known in which the magnetic card is moved manually and the movement of the magnetic card is sensed by a sensor which is rotated in response to the movement of the magnetic card to generate pulses proportional to its rotational speed, thus recording information on the card by using the pulses. Still another recording apparatus of manual type is known in which clock signals are recorded beforehand along one of the recording tracks on the magnetic card such that the clock signals are read and used as writing clock signals to record information on the card.

The type of apparatus in which the magnetic card is moved by an electric motor has the disadvantage to become large in size, complicated in construction and high in cost. Another apparatus of the type employing a rotary or sliding sensor so as to generate pulses of a frequency proportional to the moving speed of a magnetic card is also disadvantageous in that the generated pulse frequency is limited by the construction of the pulse sensor used.

As a rule, the recording of information with a high recording density requires the use of pulses having a high frequency. Conventionally, a type of sensor has been used as a highly accurate method, in which a round or long plate is provided with slits and a light source and a photo sensor are arranged facing the slits so as to sense a light signal passing through the slit. However, there is a physical limitation to the provision of slits, and thus it is difficult to generate high-frequency pulses. Another disadvantage is that, in order to generate desired high-frequency pulses, the movement of the pulse sensor must be mechanically amplified in relation to the amount of movement of the card, thus making the apparatus not only complicated in construction but also large in size.

The apparatus of the type in which a clock signal recorded beforehand along one of the recording tracks on a magnetic card is read and an information signal is recorded along another track in synchronism with the clock signal read, is disadvantageous in that not only the recording capacity is decreased by the use of one of the tracks exclusively for the purpose of recording the clock signal but also there is a problem of the occurrence of cross-talk between the channels of the magnetic head due to the recording performed while reading the clock signal, thus placing limitations on the recording system and the recording density in view of the necessity of overcoming the problem of cross-talk. Moreover, the recent developments in the standardization of magnetic cards have made it necessary to record information on a plurality of recording tracks of the card with different recording densities, thus making it difficult to use one of the recording tracks exclusively for the purpose of recording the clock signal.

SUMMARY OF THE INVENTION

With a view to overcoming the foregoing deficiencies in the prior art, it is the object of the present invention to provide an improved magnetic card recording apparatus so designed that the movement of a magnetic card is detected as an electric signal by a variable resistor having a movable member which is moved in response to the movement of the magnetic card, whereby the detected signal is passed through a differentiation circuit to generate an electric signal proportional to the moving speed of the magnetic card and an oscillator is made to oscillate at a frequency proportional to the electric signal to generate an output which is used as clock signals for writing data on the magnetic card, thereby making it possible to always record data on the magnetic card with a predetermined high recording density even if the moving speed of the card varies.

DESCRIPTION OF THE PREFERRED EMBODIMENT

A preferred embodiment of the present invention will now be described with reference to the accompanying drawings.

Figure 1:
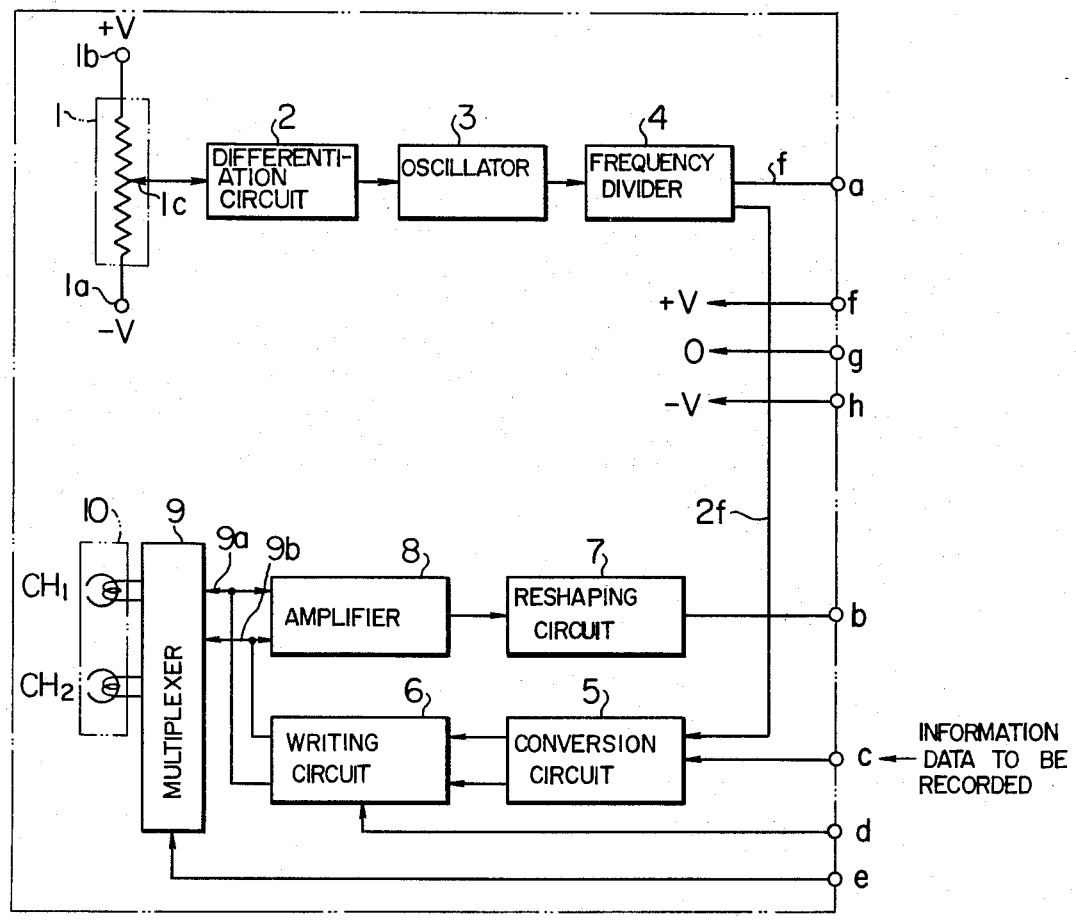
FIG. 1 is a block diagram showing the construction of an apparatus according to an embodiment of the present invention.

FIG. 1 is a block diagram showing the overall construction of an apparatus according to the embodiment of this invention. In the Figure, numeral 1 designates a variable resistor having its ends or terminals $1a$ and $1b$ supplied with power supply voltages $-V$ and $+V$, respectively, and a sliding contact $1c$ of its sliding element is usually at its home position on the side of the terminal $1a$. During the recording of information on the magnetic card, the sliding contact $1c$ is moved to a position on the $+V$ side in response to the movement of the magnetic card and then it is moved back to the home position on the $-V$ side upon completion of the recording operation. In this embodiment, a DC voltage of $-5$ V is applied as the $-V$ and a DC voltage of $+5$ V is applied as the $+V$.

Numeral 2 designates a differentiation circuit whose input terminal is connected to the sliding contact $1c$ of the sliding element of the variable resistor 1 so as to receive a voltage signal produced when the movement of the magnetic card is converted to a voltage change. Numeral 3 designates an oscillator which outputs a rectangular wave of a frequency proportional to its input voltage. Numeral 4 designates a frequency divider for dividing the frequency of the input rectangular wave to deliver from its terminal a an output signal having a frequency f. Numeral 5 designates a conversion circuit in which an information pulse signal to be written applied through a terminal c is converted to have a form suitable for the purpose of magnetic recording. In the present invention, an input information signal of the NRZ type is converted and recorded as a frequency-modulated pulse signal. More specifically, the magnetic recording system used in the present embodiment of the invention is a two-frequency coherent phase recording system employing pulse rate modulation (abbreviated as PRM) system such as disclosed in U.S. Pat. Nos. 2,853,357 and 3,217,329. In this magnetic recording system, the waves to be used for the recording purpose include two harmonically related waves (usually a first wave of one frequency and a second wave whose frequency is twice that of the first wave) and it is a usual practice to use a wave of a longer period as a timing wave and the other wave of a shorter period as a modulating wave for indicating a binary value. If there is the superposition of the modulating wave during a half cycle of the timing wave, a binary value of "1" is denoted, whereas a binary value of "0" is denoted if there is solely the timing wave without any superposition of the modulating wave. In the present embodiment, in addition to the output signal of the frequency f delivered from the terminal a, another signal having a frequency 2f which is two times the frequency f if separately supplied from the frequency divider 4 to the conversion circuit 5 for converting the input information signal to a signal to be recorded according to the two-frequency coherent phase recording system.

Numeral 6 designates a writing circuit whose output stage is usually maintained in a high impedance condition by a writing control signal applied via a terminal d. During the writing on the magnetic card, the signal from the conversion circuit 5 is made to pass through the writing circuit 6 by the writing control signal and the signal is applied to a magnetic head 10 via a multiplexer 9. In other words, the writing circuit 6 controls a current supplied to the magnetic head 10 for the purpose of magnetic recording. The multiplexer 9 is designed so that during the writing on the magnetic card the signal applied for recording via its input terminal 9a or 9b is supplied to a channel $CH_1$ or $CH_2$ of the magnetic head 10. The selection between the channels $CH_1$ and $CH_2$ is effected by the channel selection signal applied through a terminal e. In the case of this embodiment, the channel $CH_1$ is selected when the channel selection signal is at a logical level "1" (+5 V) and the channel $CH_2$ is selected when the channel selection signal is at a logical level "0" (0 V).

When the signal recorded on the magnetic card is to be read, the multiplexer 9 connects a desired magnetic head channel ($CH_1$ or $CH_2$) to be read to the terminal 9a or 9b and the signal read is applied to an amplifier 8. At this time, the writing circuit 6 is externally controlled such that its output circuit is maintained in a high impedance condition by the writing control signal but this has no effect on the amplifier 8, the multiplexer 9 and the magnetic head 10. The signal read from the magnetic card by the magnetic head 10 is amplified through the amplifier 8 to a predetermined level. Numeral 7 designates a reshaping circuit. The signal read from the magnetic card has a differentiated waveform corresponding to the reversals of the N and S poles on the magnetic card. This waveform is amplified by the amplifier 8, reshaped into a rectangular waveform by the reshaping circuit 7, and then delivered to the outside from a terminal b. Terminals f, g and h are power supply terminals for the apparatus so that a +V voltage (+5 V), 0 voltage (0 V) and −V voltage (−5 V) are respectively supplied from the terminals f, g and h to the component elements of the apparatus. In FIG. 1, the wiring for supplying the supply voltages to the component elements of the apparatus is not shown for the purpose of simplification.

Figure 2:
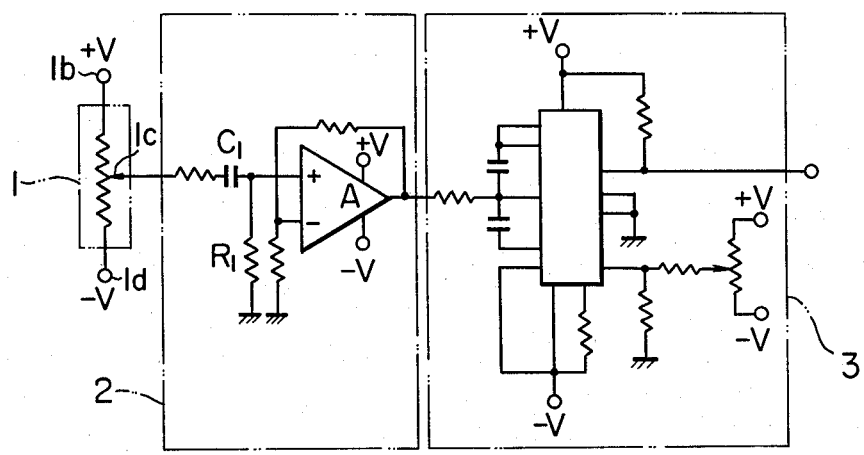
FIG. 2 is a wiring diagram showing the connection of the magnetic card movement detecting variable resistor, the differentiation circuit and the oscillator shown in FIG. 1.

FIG. 2 is a wiring diagram showing the actual construction of the variable resistor 1, the frequency divider 2 and the oscillator 3, respectively, which are shown in FIG. 1. Of these component parts, the differentiation circuit 2 is constructed by using an operational amplifier A and is of the conventional type. The differential coefficient is preset by a capacitor $C_1$ and a resistor $R_1$ in the input circuit.

In the present embodiment, magnetic cards having a magnetic stripe of 86 mm long are used and the card is manually moved to slide over the surface of the magnetic head. Thus, in response to the movement of the magnetic stripe past the magnetic head, the sliding contact 1c of the variable resistor 1 is moved from the "−V" position to the "+V" position. An ideal voltage variation is a linear voltage variation as shown by the time chart (a) in FIG. 3. In this case, as shown by the solid line in FIG. 3 (a), the time T during which the voltage changes from −V to +V becomes a factor which determines the differential coefficient. In the case of this embodiment, it is arranged so that a normal operation is ensured if the sliding element of the variable resistor 1 is moved in a manner such that the value of T falls in the range of 50 to 500 m sec. In other words, the values of the capacitor $C_1$ and the resistor $R_1$ are so selected that the application of a triangular wave of 0.1 to 1 Hz to the differentiation circuit 2 results in the generation of a rectangular wave as shown at (b) in FIG. 3. The oscillator 3 receives as its input the output voltage of the differentiation circuit 2, and it generates pulses at an oscillation frequency proportional to the input voltage. In the present embodiment, it is preset so that the oscillation frequency varies linearly within the range from 0 Hz to 100 kHz in response to an input voltage in the range from −V (−5 V) to +V (+5 V).

Figure 3:
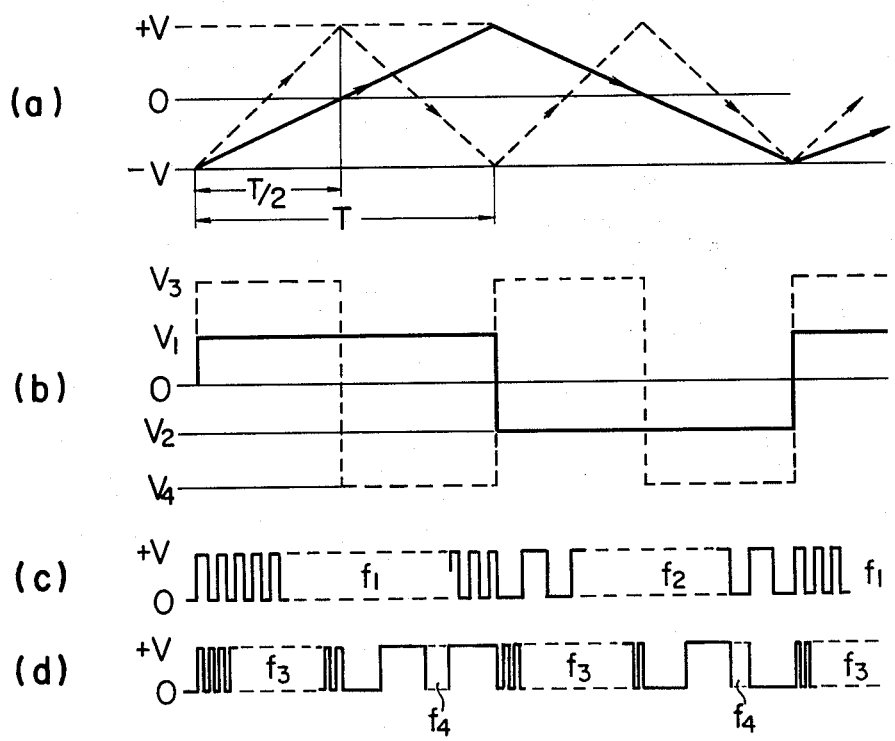
FIG. 3, including $a$–$d$, is a timing chart useful for explaining the operation of the circuits shown in FIG. 2.

FIG. 3 is a timing chart useful for explaining the operation of the electric circuits which are constructed as shown in FIG. 2.

Shown at (a) in FIG. 3 is an ideal variation of the voltage at the sliding contact 1c corresponding to the movement of the sliding element of the variable resistor 1. In fact, the value of the time T is varied in dependence on the sliding speed of the magnetic card.

Shown at (b) in FIG. 3 is the output of the differentiation circuit 2. The values of $V_1$ and $V_2$ are varied in proportion to the value of T shown at (a) in FIG. 3. The values of $V_1$ and $V_2$ increase with an increase in the moving speed of the magnetic card, that is a decrease in the value of T, and the values thereof decrease with a decrease in the moving speed. Theoretically, the values of $V_1$ and $V_2$ are directly proportional to the moving speed.

Shown at (c) in FIG. 3 is the output of the oscillator 3. Shown at (d) in FIG. 3 is also the output of the oscillator 3 corresponding to the case where the speed of the movement of the sliding element of the variable resistor 1 is two times as high as that of the case of (c) in FIG. 3.

Figure 4:
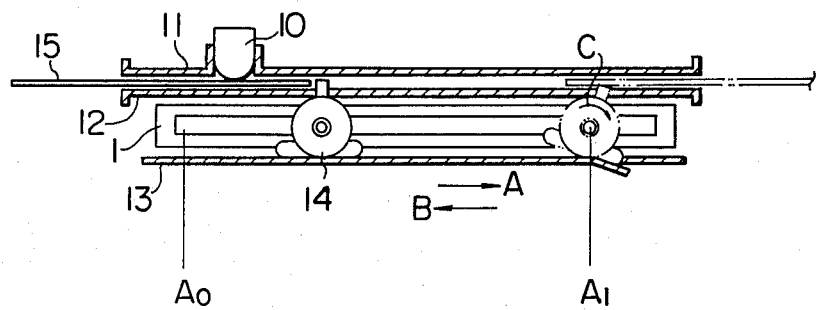
FIG. 4 is a schematic diagram for explaining the principle of a related operation of a magnetic card and the variable resistor.

FIG. 4 is a diagram showing the operating principle of a magnetic card 15 and the variable resistor 1 in relation to each other. In the Figure, the magnetic card 15 is moved through a slit formed by guide portions 11 and 12. These guide portions will hereinafter be simply referred to as guides 11 and 12. The magnetic head 10 is fixed to the guide 11 at a position such that when the magnetic card 15 is moved through the slit, the gap of the magnetic head 10 is brought into intimate contact with the magnetic stripe on the magnetic card 15. Numeral 14 designates a roller having a center hole into which inserted is the lever of the sliding element of the variable resistor 1. This construction permits the rotation of the rotational part of the roller 14, but the flat surface portion of the rotational part contacts with a plate designated by 13 which will be described later, so that the rotation of the rotational part is prevented on the left side of a position of the plate 13 designated by $A_1$. When the magnetic card 15 is moved from the left to the right in the direction of an arrow indicated by A, the card 15 abuts against a projection formed on a part of the rotational part of the roller 14 to extend into the slit, so that the roller 14 is moved to the right and the sliding element of the variable resistor 1 is moved also to the right. The lever of the sliding element of the variable resistor 1 is pulled in the direction of an arrow indicated by B by the tension of a spring which is not shown and the center of the lever is usually at its home or rest position indicated by $A_0$. The plate 13 is fixed with a predetermined distance maintained from the guide 12 so as to support the roller 14 and to prevent it from falling off. The plate 13 has a relief formed at the position $A_1$ thereof, so that when the roller 14 is moved to this position by being pushed by the magnetic card 15, the roller 14 is rotated in the direction of an arrow indicated by C and the card 15 is allowed to pass in the direction of the arrow A. Although not shown, the guides 11 and 12, the variable resistor 1 and the plate 13 are fixed at a lower position in FIG. 4 such that they are joined together to form a unit.

With the construction described above, the operation of the apparatus according to the invention will now be described.

In FIG. 4, when the magnetic card 15 is inserted into the slit formed by the guides 11 and 12 and moved in the direction of the arrow A so that its forward end reaches the position $A_0$, the forward end of the magnetic card 15 abuts against the projection formed on the rotational part of the roller 14 and the roller 14 is pushed in the direction of the arrow A, thus causing the magnetic card 15 and the roller 14 to be moved together in the direction of the arrow A. In this case, while the roller 14 tends to rotate in the direction of the arrow C as it is pushed, its portion contacting the plate 13 prevents its rotational movement, so that the roller 14 can not rotate. Since the lever of the sliding element of the variable resistor 1 is inserted into the center hole of the roller 14 so that the roller 14 can rotate about the lever, in response to the movement of the magnetic card 15 the sliding element of the variable resistor 1 is simultaneously moved in the direction of the arrow A. In this way, the movement of the magnetic card 15 is transferred to the movement of the sliding element of the variable resistor 1. When the roller 14 moving in the direction of the arrow A reaches the position $A_1$, since the plate 13 is provided with the relief, the rotational part of the roller 14 is permitted to rotate in the direction of the arrow C and the roller 14 is rotated through a predetermined angle. This rotation of the roller 14 causes the projection formed on a part of its rotational part to rotate simultaneously and an opening appears between the guide 11 and the projection on the roller 14 to permit the magnetic card 15 to pass through the opening. Thus, the magnetic card 15 passes in the direction of the arrow A and is sent out of the slit. Since the sliding element of the variable resistor 1 is always pulled in the direction of the arrow B by the tension of a spring which is not shown, when the projection on the roller 14 is released from the contact with the rear end of the magnetic card 15, the assembly including the roller 14 is moved in the direction of the arrow B with its rotational part rotated in a direction opposite to the direction of the arrow C until it stops again at its home position. By the operation described so far, the movement of the magnetic card 15 is transferred to the movement of the sliding element of the variable resistor 1.

The fixed terminals 1a and 1b of the variable resistor 1 are respectively connected to the DC voltage sources of $-V$ ($-5$ V) and $+V$ ($+5$ V) as shown in FIG. 2 and thus the movement of the magnetic card 15 is detected as a voltage variation by the sliding contact 1c of the variable resistor 1. Then, the detected voltage variation is converted into a voltage proportional to the moving speed of the magnetic card 15 through the differentiation circuit 2. If the time required for the voltage variation ranging from $-V$ to $+V$ is T as shown in FIG. 3, the differentiation circuit 2 generates a voltage of the magnitude $V_1$. From the principle of differentiation it is apparent that the voltage corresponds to the slope of the voltage variation curve from $-V$ to $+V$ and the magnitude $V_1$ represents an instantaneous moving speed of the magnetic card 15.

The broken lines shown at (a) and (b) in FIG. 3 show the case where the variation from $-V$ to $+V$ is effected in the time of T/2, with the result that the tangent of the inclination angle of the straight line is doubled and the differentiated output is also doubled. Namely, as shown at (b) in FIG. 3, $V_3 = 2 \times V_1$ results in the case of the time of T/2 as compared with $V_1$ in the case of the time of T. The above description is based on the assumption that the magnetic card 15 is moved at a constant speed and the output voltage of the variable resistor 1 varies linearly. However, even if the output voltage does not vary linearly, the relationship between the input and output signals of the differentiation circuit 2 is all the same, and after all the differentiation circuit 2 can generate an output voltage proportional to the moving speed of the magnetic card 15.

The oscillator 3 of FIG. 2 is a voltage-controlled oscillator which generates pulses of a frequency proportional to an input voltage, and in this embodiment the oscillator 3 generates a signal of the frequency in the range of 0 to 100 kHz linearly in response to an input voltage ranging from $-V$ ($-5$ V) to $+V$ ($+5$ V). As will be seen from the timing chart of FIG. 3, if the magnetic card 15 is moved in the time of T, the oscillator 3 generates pulses of a frequency $f_1$ shown at (c) in FIG. 3. It is apparent that if the moving time is T/2, the output frequency of the oscillator 3 becomes $f_3$ as shown at (d) in FIG. 3 and the relationship of $f_3 = 2 \times f_1$ holds between the frequencies $f_1$ and $f_3$.

By virtue of the operation described above, the moving speed of the magnetic card 15 is detected and the oscillator 3 generates pulses of a frequency proportional to the moving speed.

While the foregoing description has been made with reference to the case where the magnetic card 15 and hence the sliding element of the variable resistor 1 is moved at a constant speed throughout the range of the voltage variation from $-V (-5 V)$ to $-V (+5 V)$, the output signal of the oscillator 3 comprises a pulse train having a frequency proportional to an instantaneous speed of the magnetic card 15, and consequently if an information signal is recorded by the magnetic head 10 on the magnetic card 15 in synchronism with the oscillator output pulses, the recording can always be effected with a constant recording density. Generally, two recording densities of 75 and 210 BPI (bits/inch) are used for recording on the magnetic card 15. Therefore, it is advantageous to effect frequency division as required to obtain a suitable pulse train to be used as writing clock pulses. The frequency divider 4 is used for this purpose and it is constituted by an ordinary IC to be used for counters.

The operation of the apparatus will now be described by way of example with reference to a case where the recording density of 210 BPI is used for recording. If the length of a magnetic stripe on the magnetic cards 15 used is 86 mm (3.39 inches), the number of bits to be recorded on each one of the magnetic cards 15 amounts to $210 \times 3.39 = 711.9 \approx 711$ bits. If the writing time depending on the moving speed of the magnetic card 15 is given as $T = 500$ msec, the recording speed of data to be written is $711 \times 2 = 1422$ BPS (bits/sec). If it is arranged so that the pulse rate modulation system is used as the form of writing and that a pulse of a frequency f is recorded to represent the logical level "0" and a pulse of a frequency 2f is recorded to represent the logical level "1," and if all the data bits of the data to be recorded are "1," the frequency of the data to be written is 1422 Hz when $T = 500$ msec. Thus, in this case, 711 Hz pulses are generated from the terminal a in FIG. 1 and the information data to be written is applied from the terminal c in synchronism with these pulses. Simultaneously, a writing control signal is applied from the terminal d to release the high impedance state of the output stage of the writing circuit 6, and a channel selection signal is applied from the terminal e to the multiplexer 9 such that one of the channels of the magnetic head 10 which is to be used for recording and a desired one of the input terminals 9a and 9b of the multiplexer 9 are selected and interconnected. Thus, it is made possible to record the input data of the NRZ type with the predetermined constant recording density by using the magnetic head 10.

If the moving speed of the magnetic card 15 is increased so that its movement is completed in the time of T/2, for example, it is apparent from the foregoing description that $T = 250$ msec holds and the frequency of the input data becomes 2844 Hz. Then, the frequency divider 4 may also function to supply pulses of such a frequency.

On the other hand, if the recording density is fixed at 75 BPI and the same writing time of $T = 500$ msec is used, the recording speed of the data to be written becomes 508 BPS and thus it is necessary only to select the dividing ratio of the frequency divider 4 to be 2.8 times that used when the recording density is 210 BPI.

It will be seen from the foregoing that by varying the dividing ratio of the frequency divider 4 depending on a desired recording density on the magnetic card 15, it is possible to easily supply pulses of an optimum frequency for the desired recording density. To make it possible to select any desired recording density in this way in the magnetic card recording apparatus of this invention, the frequency divider 4 may be provided with a suitable adjusting or switching device for manually or automatically changing the frequency dividing ratio to a desired value. In particular, when it is desired to increase the recording density, it is possible to easily generate pulses of such a high frequency that has never been generated in the prior art recording apparatus. For instance, the recording apparatus of this invention can be readily adapted without any change in its construction for the recording with such a high recording density that is greater than 210 BPI.

In addition to serving the purpose of dividing the frequency to obtain a desired frequency, the frequency divider 4 may also serve the purpose of preventing noise. In other words, if noise is mixed into the output of the differentiation circuit 2, it causes the output frequency of the oscillator 3 to be varied.

However, since the oscillation frequency of the oscillator 3 is selected to be very high and desired frequency to be used can be obtained by the division of the oscillation frequency, the percentage of variation of the oscillation frequency caused by noise in the high oscillation frequency band can be reduced, and this brings an advantage of the relative prevention of adverse effects by noise.

Next, when it is desired to read the magnetic card 15 having the information date recorded therein with a predetermined recording density in the manner described above, the reading can be accomplished easily by maintaining the output stage of the writing circuit 6 in the high impedance state by the writing control signal applied from the terminal d. Namely, if the magnetic card 15 is moved so that the signal detected by the magnetic head 10 is amplified by the amplifier 8, reshaped into a rectangular wave and delivered from the terminal b, the output can be easily read by applying it to another external apparatus which is not shown.

While, in the above-described embodiment, the movement of the magnetic card 15 is detected by means of the variable resistor 1, any other arrangement can also be used in which a variable capacitor, differential transformer or the like is used to detect the movement in terms of variations of capacitance or inductance. Further, while the variable resistor 1 of the linearly sliding type is used, it may be replaced by a rotary type, and further it is possible to employ a simpler construction which has a resistance material directly deposited onto the guide 11 or 12 and a sliding contact element combined therewith. Further, the number of channels for the multiplexer 9 and the magnetic head 10 is not limited to two and the number can be increased easily.

It will thus be seen from the foregoing description that in accordance with the present invention, it is possible to record with a predetermined high recording density on a magnetic card moving at a varying speed, and this invention can be used all the more advantageously for the writing of magnetic cards, particularly for the writing of magnetic cards by a manual operation.

Another advantage of the recording apparatus according to the invention is that it is not necessary to employ an electric motor for the operation of the apparatus, and this has the effect of not only reducing the size and weight of the apparatus, but also simplifying its mechanism, thereby making the apparatus less susceptible to failure.

Further, since the recording apparatus of this invention is small in size and low in cost and ensures easy recording and reproduction of magnetic cards, the apparatus has a very wide field of practical application.

Still another advantage of the recording apparatus according to the invention is that when it is desired to record on a magnetic card with a higher recording density than that of the conventional apparatuses, the apparatus of this invention can readily meet the requirement without making any change in the structure.

I claim:

1. An apparatus for magnetically recording information on a magnetic card comprising:
   guide means disposed to guide a moving magnetic card;
   magnetic head means positioned to contact with said magnetic card moving through said guide means;
   electric signal generator means having a movable member moved in response to the movement of said magnetic card for producing an output electric signal having a characteristic corresponding to said movement;
   voltage signal generator means receiving said output electric signal for generating an output voltage signal of a magnitude proportional to a speed of the movement of said magnetic card;
   oscillator means oscillating at a frequency proportional to the magnitude of said output voltage signal of said voltage signal generator means;
   converting means receiving an input information signal to be recorded for converting the same in response to an output signal of said oscillator means; and
   writing control means controlling the recording of an output signal of said converting means on said magnetic card;
   whereby the recording of information with a predetermined high recording density is enabled irrespective of the moving speed of said magnetic card,
   wherein said electric signal generator means includes a varible resistor having a movable member moved by said moving magnetic card, and
   wherein said voltage signal generating means includes differentiation circuit means for producing said output voltage signal as a differentiation of said output electric signal from said electric signal generator means.

2. An apparatus for magnetically recording information on a magnetic card comprising:
   guide means disposed to guide a moving magnetic card;
   magnetic head means positioned to contact with said magnetic card moving through said guide means;
   electric signal generator means having a movable member moved in response to the movement of said magnetic card;
   voltage signal generator means receiving an output electric signal of said electric signal generator means for generating an output voltage signal of a magnitude proportional to a speed of the movement of said magnetic card;
   oscillator means oscillating at a frequency proportional to the magnitude of said output voltage signal of said voltage signal generator means;
   converting means receiving an input information signal to be recorded for converting the same in response to an output signal of said oscillator means; and
   writing control means controlling the recording of an output signal of said converting means on said magnetic card;
   whereby the recording of information with a predetermined high recording density is enabled irrespective of the moving speed of said magnetic card, and
   wherein said electric signal generator means includes a variable resistor having a movable member moved by said moving magnetic card, and
   wherein said variable resistor includes a combination of a portion of said guide means having a resistance material deposited thereon and said movable member.

3. A magnetic card recording apparatus according to claim 2, further comprising frequency divider means connected to an output terminal of said oscillator means such that a first frequency-divided output wave is supplied as a modulating wave to said converting means and that said information signal to be recorded is sequentially applied to said converting means in synchronism with a second frequency-divided output wave.

4. A magnetic card recording apparatus according to claim 3, wherein said frequency divider means includes means for automatically or manually changing a dividing ratio thereof to a desired value to set said recording density to a desired value.

5. An apparatus for magnetically recording information on a magnetic card comprising:
   magnetic head means activated when information to be recorded is supplied for magnetically recording the same on a magnetic card;
   guide means enabling said magnetic card to be manually moved therethrough for magnetic recording by said magnetic head means;
   first voltage generator means having a movable member moved by said magnetic card and generating a first voltage continuously varying in accordance with the moving position of said movable member;
   second voltage generator means receiving the first voltage and generating a second voltage continuously varying in proportion to the moving speed of said movable member;
   oscillator means controlled by the second voltage and generating oscillation signals at a frequency directly proportional to the magnitude of the second voltage; and
   information supply means supplying said magnetic head means with information to be recorded in synchronism with said oscillation signals,
   wherein said first voltage generator means includes a variable resistor having a movable member moved by said moving magnetic card,
   said variable resistor including a combination of a portion of said guide means having a resistance material deposited thereon and said movable member.

6. An apparatus for magnetically recording information on a magnetic card comprising:

magnetic head means activated when information to be recorded is supplied for magnetically recording the same on a magnetic card;

guide means enabling said magnetic card to be manually moved therethrough for magnetic recording by said magnetic head means;

first voltage generator means having a movable member moved by said magnetic card and generating a first voltage continuously varying in accordance with the moving position of said movable member;

second voltage generator means receiving the first voltage and generating a second voltage continuously varying in proportion to the moving speed of said movable member;

oscillator means controlled by the second voltage and generating oscillation signals at a frequency directly proportional to the magnitude of the second voltage; and information supply means supplying said magnetic head means with information to be recorded in synchronism with said oscillation signals, wherein said first voltage generator means includes a variable resistor having a movable member moved by said moving magnetic card, and wherein said second voltage generator means comprises differentiation circuit means which produces said second voltage as a differentiation of said first voltage.

7. Magnetic card recording apparatus according to claim 6, further comprising frequency divider means connected to an output terminal of said oscillator means such that a first frequency-divided output wave is supplied as a modulating wave to said converting means and that said information signal to be recorded is sequentially applied to said converting means in synchronism with a second frequency-divided output wave.

8. Magnetic card recording apparatus according to claim 7, wherein said frequency divider means includes means for automatically or manually changing a dividing ratio thereof to a desired value to set said recording density to a desired value.

9. Magnetic card recording apparatus as in claim 6 wherein:

said differentiation circuit means comprises an operational ampifier having two inputs and an output, an input capacitor connected between said variable resistor to receive said first voltage and one of said amplifier inputs, an input resistor connected between said one input and ground, and a plurality of other resistors in series between said amplifier output and ground, a junction between said other resistors being connected to the other of said amplifier inputs.

* * * * *